(12) United States Patent
Nelson et al.

(10) Patent No.: US 12,489,626 B2
(45) Date of Patent: Dec. 2, 2025

(54) PAIRING HARDWARE COMPONENTS TO AUTHORIZE OPERATION

(71) Applicant: Hewlett-Packard Development Company, L.P., Spring, TX (US)

(72) Inventors: Marvin Duane Nelson, Boise, ID (US); Honee Lee Mesa, Boise, ID (US); Jennifer Lynn Melin, Boise, ID (US); Brian C Mayer, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 270 days.

(21) Appl. No.: 18/016,536

(22) PCT Filed: Jul. 20, 2020

(86) PCT No.: PCT/US2020/042766
§ 371 (c)(1),
(2) Date: Jan. 17, 2023

(87) PCT Pub. No.: WO2022/019880
PCT Pub. Date: Jan. 27, 2022

(65) Prior Publication Data
US 2023/0275760 A1    Aug. 31, 2023

(51) Int. Cl.
*H04L 9/30* (2006.01)
*G06F 21/44* (2013.01)
*H04L 9/32* (2006.01)

(52) U.S. Cl.
CPC .......... *H04L 9/3073* (2013.01); *G06F 21/445* (2013.01); *H04L 9/3234* (2013.01)

(58) Field of Classification Search
CPC .... H04L 9/3073; H04L 9/3234; G06F 21/445
See application file for complete search history.

(56) References Cited

U.S. PATENT DOCUMENTS

| 6,871,028 | B2 | 3/2005  | Rodriguez     |
|-----------|----|---------|---------------|
| 7,907,901 | B1 | 3/2011  | Kahn et al.   |
| 9,807,610 | B2 | 10/2017 | Rasheed et al.|
| 9,832,026 | B2 | 11/2017 | Kravitz et al.|

(Continued)

FOREIGN PATENT DOCUMENTS

| CN | 106796641 A | 5/2017  |
|----|-------------|---------|
| CN | 107409118 A | 11/2017 |

(Continued)

*Primary Examiner* — Ayoub Alata
(74) *Attorney, Agent, or Firm* — Brooks, Cameron & Huebsch, PLLC

(57) ABSTRACT

According to examples, an apparatus may include a first hardware component including a first memory and a first processor. The first processor may initiate pairing between the first hardware component and a second hardware component to establish a trusted relationship between the first hardware component and a second hardware component. In response to a successful pairing between the first hardware component and the second hardware component, the processor may compare a first setting of the first hardware component with a second setting of the second hardware component. In response to a determination that the second setting corresponds to the first setting, the processor may authorize operation of the second hardware component.

16 Claims, 4 Drawing Sheets

(56) References Cited

U.S. PATENT DOCUMENTS

| | | |
|---|---|---|
| 2009/0222910 A1 | 9/2009 | Le Bihan et al. |
| 2011/0099361 A1 | 4/2011 | Shah et al. |
| 2015/0347727 A1 | 12/2015 | Johnson et al. |
| 2016/0182499 A1* | 6/2016 | Sharaga ............... G06F 21/82 713/156 |
| 2016/0248592 A1 | 8/2016 | Hawblitzel et al. |
| 2017/0201886 A1 | 7/2017 | Yang et al. |
| 2018/0048643 A1 | 2/2018 | Sharaga et al. |
| 2019/0036689 A1* | 1/2019 | Schiffman ............. H04L 9/0861 |

FOREIGN PATENT DOCUMENTS

| | | |
|---|---|---|
| WO | 2013/076625 A1 | 5/2013 |
| WO | 2016/105784 A1 | 6/2016 |
| WO | 2017/049539 A1 | 3/2017 |

* cited by examiner

PAIRING HARDWARE COMPONENTS TO AUTHORIZE OPERATION

BACKGROUND

Electronic devices, including computing devices, may be made up of many different hardware components. These hardware components may be replaced in the electronic devices.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
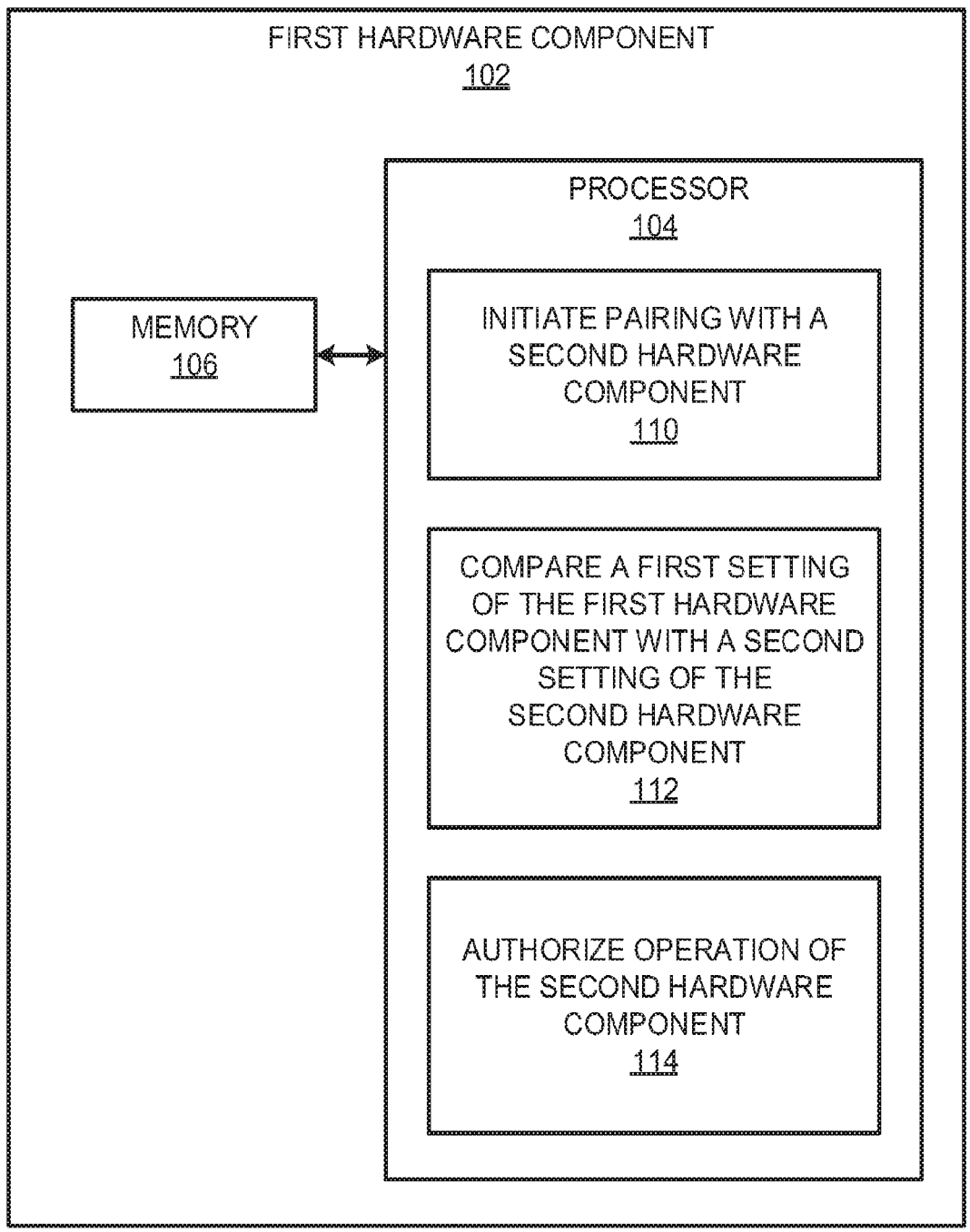
FIG. 1 depicts a block diagram of an example apparatus that may include a first hardware component that may initiate pairing with a second hardware component to establish a trusted relationship and to authorize operation of the second hardware component.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, systems, methods, and computer-readable media that may establish trusted relationships between hardware components and authorize operation of the hardware components based on the established trusted relationships. Electronic devices, such as printers, personal computers, or the like, may be made up of many different hardware components. The hardware components may include various types of control boards, such as digital control boards or analog control boards, print cartridges, fusers, scanners, and/or the like. Many of these hardware components may have settings that enable an authorized functionality for the hardware components associated with a particular electronic device, for instance, a functionality that corresponds to a business logic associated with the particular electronic device.

By way of particular example and for purposes of illustration, an electronic device may have multiple hardware components and may maintain business logic settings for the hardware components. For instance, a business may develop products to sell in multiple configurations, and some of the different configurations may be associated with different business logic (e.g., an authorized functionality, licensed features, and/or the like) for specific products. In this regard, for instance, a product sold at a higher price point may have additional and/or different functionalities that are enabled compared to a product sold at a lower price point.

A concern associated with such a product may be that a lower priced product may be purchased and modified in an unauthorized manner, for instance by replacing a hardware component in the apparatus to override a business logic associated with the purchased product. The example apparatuses, systems, methods, and computer-readable media of the present disclosure may enable the business logic to be securely maintained across multiple higher performing and thus relatively more expensive hardware components, which may prevent, for instance, a lower performing model from being purchased, then converted to a higher performing model by a replacing hardware component.

In some examples, an apparatus may include a first hardware component that includes a first memory and a first processor. The first processor may initiate pairing between the first hardware component and a second hardware component to establish a trusted relationship between the first hardware component and a second hardware component. In response to a successful pairing between the first hardware component and the second hardware component, the processor may compare a first setting of the first hardware component with a second setting of the second hardware component. In this regard, in response to a determination that the second setting corresponds to the first setting, the processor may authorize operation of the second hardware component.

By enabling pairing of hardware components to establish trusted relationships, the hardware components within an apparatus may be implemented to securely maintain a predetermined functional configuration of the apparatus, such as a secure business logic, across multiple hardware components throughout the life of the product. The example apparatus of the present disclosure may improve security by using trusted relationships between hardware components to prevent unauthorized replacement of hardware components, by enabling one hardware component to prevent operation of another, unauthorized hardware component each time power is turned on. In this regard, each hardware component may have a unique identity, and thus a hardware component may not simply be uninstalled from a first apparatus and installed in a second apparatus to replace a corresponding hardware component in the second apparatus. As such, the example apparatus of the present disclosure may prevent, for instance, unauthorized conversion of a lower performing (e.g., a lower priced) model to a higher performing (e.g., higher priced) model through replacement of hardware components of the apparatus. In some examples, a new hardware component may obtain authorization from a cloud service before the new hardware component may be installed on a device, thereby preventing unauthorized changes to hardware components.

Figure 2:
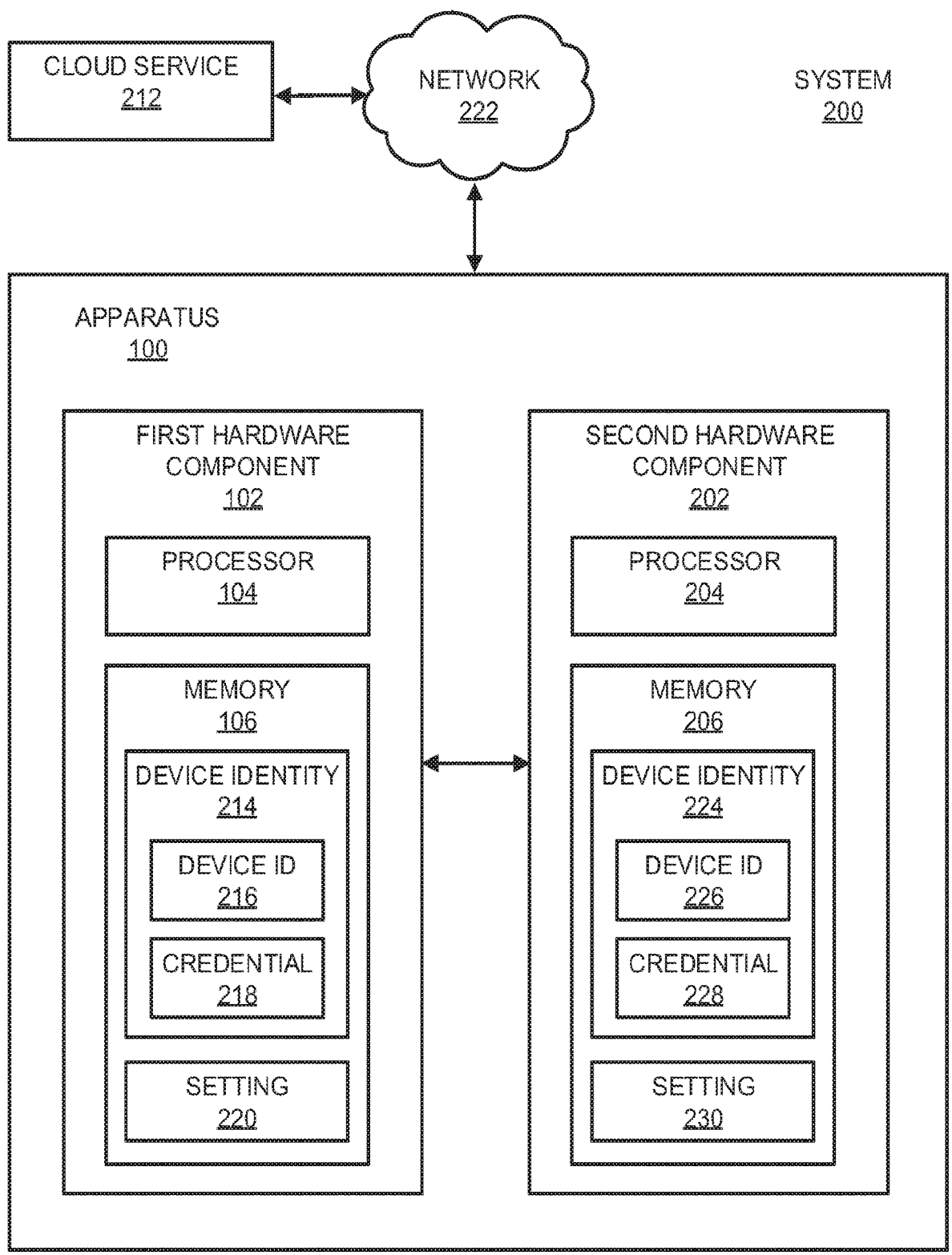
FIG. 2 shows a block diagram of an example system that may include the example apparatus depicted in FIG. 1.

Reference is first made to FIGS. 1 and 2. FIG. 1 shows a block diagram of an example apparatus 100 that may include a first hardware component 102 that may initiate pairing with a second hardware component to establish a trusted relationship and to authorize operation of the second hardware component. FIG. 2 shows a block diagram of an example system 200 that may include the example apparatus 100 depicted in FIG. 1. It should be understood that the apparatus 100 depicted in FIG. 1 and/or the system 200 depicted in FIG. 2 may include additional features and that some of the features described herein may be removed and/or modified without departing from the scopes of the apparatus 100 and/or the system 200.

The apparatus 100 may include a first hardware component 102, which may include a first processor 104 and a first memory 106. The apparatus 100 may be a printer, a multi-function apparatus, and/or a computing device, such as a server, a node in a network (such as a data center), a personal computer, a laptop computer, a tablet computer, a smartphone, a network gateway, a network router, an electronic device such as Internet of Things (IoT) device, and/or the like. By way of particular example, the first hardware component 102 of the apparatus 100 may be a component of a printer, including for instance a control board, such as a digital control board, an analog control board, and/or the like, a cartridge, a fuser, a laser scanner, and/or the like. The second hardware component 202 may also be any of the above-listed components and may be similar to or may differ from the first hardware component 102.

Each of the processors 104 and 204 may be a semiconductor-based microprocessor, a central processing unit (CPU), an application specific integrated circuit (ASIC), a field-programmable gate array (FPGA), and/or other hardware device. Although the first hardware component 102 and the second hardware component 202 are depicted as each having a single processor 104, 204, it should be understood that the hardware components 102, 202 and/or the apparatus 100 may include additional processors and/or cores without departing from scopes of the hardware components 102, 202 and/or the apparatus 100. In this regard, references to a single processor 104, 204 as well as to a single memory 106, 206 may be understood to additionally or alternatively pertain to multiple processors 104, 204 and multiple memories 106, 206.

The memories 106, 206 may each be, for example, a non-volatile memory such as, Read-Only Memory (ROM), flash memory, solid state drive, Random Access memory (RAM), an Electrically Erasable Programmable Read-Only Memory (EEPROM), a storage device, an optical disc, or the like. By way of example, the memories 106, 206 may each be non-volatile random access memory (NVRAM), which may be implemented to store and return data over a serial programmable interface (SPI) bus/connection. In some examples, the memories 106, 206 may be a specialized memory that is integrated into, for instance, a system on a chip (SoC), a security chip, and/or the like that may provide enhanced security. In some examples, the memories 106, 206 may each be soldered on chip on the respective hardware component 102, 202, and may be used for security and secure storage.

As shown in FIG. 1, the processor 104 may perform various operations 110-114 to authorize an operation of a second hardware component 202. The operations 110-114 may be hardware logic blocks that the processor 104 may execute. In other examples, the operations 110-114 may be machine readable instructions, e.g., non-transitory computer readable instructions. In other examples, the apparatus 100 may include a combination of instructions and hardware logic blocks to implement or execute functions corresponding to the operations 110-114.

The processor 104 may execute the operation 110 to initiate pairing between the first hardware component 102 and a second hardware component, such as the second hardware component 202 depicted in FIG. 2, to establish a trusted relationship between the first hardware component 102 and the second hardware component 202. In some examples, the second hardware component 202 may be installed in the apparatus 100 together with the first hardware component 102, and may include a second processor 204 and a second memory 206. The first hardware component 102 and the second hardware component 202 may communicate via a communication protocol over a bus. In some examples, the first hardware component 102 and the second hardware component 202 may be disposed separately from each other and may be coupled over a network 222 to communicate with each other.

The pairing process may include sharing identification information, such as a first device identity 214 for the first hardware component 102 as depicted in FIG. 2, and validating the shared identification information to establish a trusted relationship between the first hardware component 102 and the second hardware component 202. By way of particular example and for purposes of illustration, the processor 104 may send a first device identity 214 associated with the first hardware component 102 to the second hardware component 202. In some examples, the first device identity 214 may include a first device identifier 216 that may uniquely identify the first hardware component 102. The first device identity 214 may include a first credential 218, which may be used to authenticate the first device identifier 216. In some examples, the first credential 218 may include asymmetric public keys, which may be built into the first hardware component 102 and used by the second hardware component 202 to verify the first device identity 214 of the first hardware component 102. In this regard, the first device identifier 216 may be an identifier that provides a uniqueness and trackability to the respective hardware component. The first credential 218 may be a credential that provides cryptographic verification of authenticity and ownership.

The second processor 204 in the second hardware component 202 may verify the first device identity 214 at the second hardware component 202. In response to a successful verification of the first device identity 214 at the second hardware component 202, the processor 104 at the first hardware component 102 may receive a second device identity 224 associated with the second hardware component 202. The second device identity 224 may uniquely identify the second hardware component 202 and may include a second device identifier 226 and a second credential 228 associated with the second hardware component 202.

In some examples, the processor 104 may initiate verification to attest that the received second device identity 224 is associated with the second hardware component 202. In this regard, the processor 104 may authenticate ownership of the second device identity 224 by the second hardware component 202. The processor 104 may use the second device identifier 226 and the second credential 228, which may be unique to the second hardware component 202, to authenticate the second device identity 224.

In some examples, the processor 104 may authenticate the second device identity 224 using information from a third hardware component (not shown), in addition to the information retrieved from the second hardware component 202. For instance, the processor 104 may initiate verification to attest that the received second device identity 224 is associated with the second hardware component 202 by using information unique to multiple hardware components. In this regard, the processor 104 may attest to the ownership of the second device identity 224 based on an authentication key, which may be generated to include a unique authentication key associated with the third hardware component, the first credential 218 associated with the first hardware component 102, and/or the second credential 228 associated with the second hardware component 202. The third hardware component may be a hardware component installed in the apparatus 100 similar to the first hardware component 102 and/or the second hardware component 202, such as a cartridge, a fuser, a laser scanner, and/or the like.

In response to a successful verification of the second device identity 224 from the second hardware component 202, the processor 104 may establish the trusted relationship between the first hardware component 102 and the second hardware component 202. In this regard, the trusted relationship between hardware components in the apparatus 100 may be verified/established throughout the life of the apparatus 100. For instance, each time the first hardware component 102 and/or the second hardware component 202 is powered on, the processor 104 may initiate the pairing and verification process to establish the trusted relationship between the first hardware component 102 and the second hardware component 202.

In some examples, in response to an unsuccessful pairing with the second hardware component 202, for instance based on an unsuccessful verification or attestation of the second device identity 224, the processor 104 may prevent operation of the second hardware component 202. In this regard, the processor 104 of the first hardware component 102 may withhold operational data and flows to render the second hardware component 202 inoperable. In some examples, the processor 104 of the first hardware component 102 may deny power, connectivity, and/or the like to the second hardware component 202 to prevent operation of the second hardware component 202. Alternatively or additionally, the processor 104 of the first hardware component 102 may fail to provide essential keying material, such as the credential 218, to allow normal operation.

In some examples, a hardware component may leverage a trusted relationship formed with one hardware component to establish a trusted relationship with another hardware component. By way of particular example, the first hardware component 102 may have a trusted relationship with a cloud service 212 in addition to a trusted relationship with the second hardware component 202. The cloud service 212 may be a server, a computing device, and/or a group of computing devices to provide a service to the apparatus 100. In this regard, the processor 104 may enable a trusted relationship to be inherited between the second hardware component 202 and the cloud service 212 based on the trusted relationship between the first hardware component 102 and the second hardware component 202 and the trusted relationship between the first hardware component 102 and the cloud service 212. In some examples, the processor 104 may enable the trusted relationship between the second hardware component 202 and the cloud service 212 to be inherited without performing the previously described process for pairing and attestation by leveraging the known trusted relationships.

In some examples, the second hardware component 202 may establish a trusted relationship with the cloud service 212, without inheriting the trusted relationship to the cloud service 212 from the first hardware component 102. In this regard, the second hardware component 202 may initiate pairing with the cloud service 212, including sharing and verification of device identities and attesting the shared device identities, as previously described with reference to the pairing with the first hardware component 102. It should be understood that the second hardware component 202 may establish a trusted relationship with a plurality of hardware components implemented in the apparatus 100, or alternatively or additionally, the second hardware component 202 may establish a trusted relationship over the network 222 with hardware components implemented in other apparatuses on the network 222.

The processor 104 may execute the operation 112 to compare a first setting 220 of the first hardware component 102 with a second setting 230 of the second hardware component 202 in response to a successful pairing between the first hardware component 102 and the second hardware component 202. In some examples, the first setting 220 may define a functionality of the first hardware component 102 and the second setting 230 may define a functionality of the second hardware component 202. The first setting 220 and the second setting 230 may be mirror copies of each other, and may be written into secure memories on respective hardware components, such as the first memory 106 and the second memory 206.

By way of particular example and for purposes of illustration, the first setting 220 may be implemented as control bits that may be written into a secure memory of the first hardware component 102. In some examples, the first setting 220 may include settings to allow replacement hardware components to pair with other hardware components, or settings to lock the first setting 220 of the first hardware component 102. In this regard, the first hardware component 102 may prevent pairing to unrecognized hardware components and/or prevent unauthorized replacement or installation of hardware components.

In some examples, the first setting 220 may include a setting to define an authorized functionality of the apparatus 100, for instance, a functionality associated with an intended business logic for the apparatus 100. By way of particular example, in a case where the second hardware component 202 is replaced in the apparatus 100 and successfully paired with the first hardware component 102, the processor 104 may verify the second setting 230 and may prevent operation of the new hardware component based on a determination that authorized functionalities have been changed, for instance, in a case where the second setting 230 does not match the first setting 220 associated with an authorized functionality.

In some examples, the processor 104 may verify the first setting 220 against the second setting 230 during a boot process for the apparatus 100. The processor 104 may, based on a determination that the first setting 220 does not correspond to the second setting 230, prevent operation of the second hardware component 202. In this regard, in response to a determination that the second setting 230 corresponds to the first setting 220, the processor 104 may execute the operation 114 to authorize operation of the second hardware component 202.

In some examples, the second hardware component 202 may authorize operation of the first hardware component 102 in a manner similar to that of the first hardware component 102, as previously described. For instance, the second processor 204 may authorize operation of the first hardware component 102 based on a trusted relationship determined by the second processor 204 and a verification of the first setting 220 and the second setting 230. For instance, in response to a successful pairing with the first hardware component 102, the second processor 204 may compare the second setting 230 of the second hardware component 202 with the first setting 220 of the first hardware component 102.

In this instance, in response to a determination that the first setting 220 corresponds to the second setting 230, the second processor 204 may authorize operation of the first hardware component 102, and in response to a determination that the pairing is unsuccessful or that the first setting 220 is different than the second setting 230, the second processor 204 may prevent operation of the first hardware component 102. In some examples, the second processor 204 may determine that the first hardware component 102 is a new hardware component and may request a cloud service 212 to authorize the new hardware component. In this regard, based on an authorization of the new hardware component from the cloud service 212, the second processor 204 may authorize operation of the new hardware component. In some examples, the cloud service 212 may include a priori information that provides the cloud service 212 with information to make a determination to authorize or deny a re-pair request for a hardware component. The information stored in the cloud service 212 may allow the cloud service 212 to track the hardware components 102, 202, including modifications, replacement, operations, state information, and/or the like, and may ensure proper operation of the hardware components 102, 202.

In some examples, when a hardware component in the apparatus 100 is replaced, the processors of the hardware components may determine which hardware component is the existing hardware component and which is the new hardware component. For instance, the processor 104 may determine that the second hardware component 202 is a new hardware component based on exchange of information, such as the first device identity 214 and the second device identity 224. In this regard, the new hardware component may be installed in the apparatus 100 and successfully paired with the first hardware component 102. In response to identifying a new hardware component, the processor 104 may request the cloud service 212 to authorize the new hardware component in the apparatus 100, and based on an authorization from the cloud service 212, the processor 104 may authorize operation of the new hardware component, for instance, may authorize the apparatus 100 to print using the newly added hardware component.

By way of particular example and for purposes of illustration, the processor 104 may determine that the second hardware component 202 is a new hardware component based on the second setting 230. In this regard, the second setting 230 may include a lock setting that may enable a lock state of the pairing information stored in the second memory 206. When the second setting 230 to enable the lock state of the pairing information in the second hardware component 202 is set, the processor 104 may obtain an authorization from the cloud service 212 for re-pairing the second hardware component 202, which was determined to be the new hardware component, to the first hardware component 102.

Although the apparatus 100 is depicted as having two hardware components, particularly the first hardware component 102 and the second hardware component 202, it should be understood that additional hardware components may be disposed in the apparatus 100 without departing from scopes of the hardware components 102, 202 and/or the apparatus 100. In this regard, the plurality of hardware components may establish a network of paired hardware components. In this instance, the first hardware component 102 may establish a plurality of pairings with each of the plurality of hardware components and/or inherit a trusted relationship with a particular hardware component as previously described.

Figure 3:
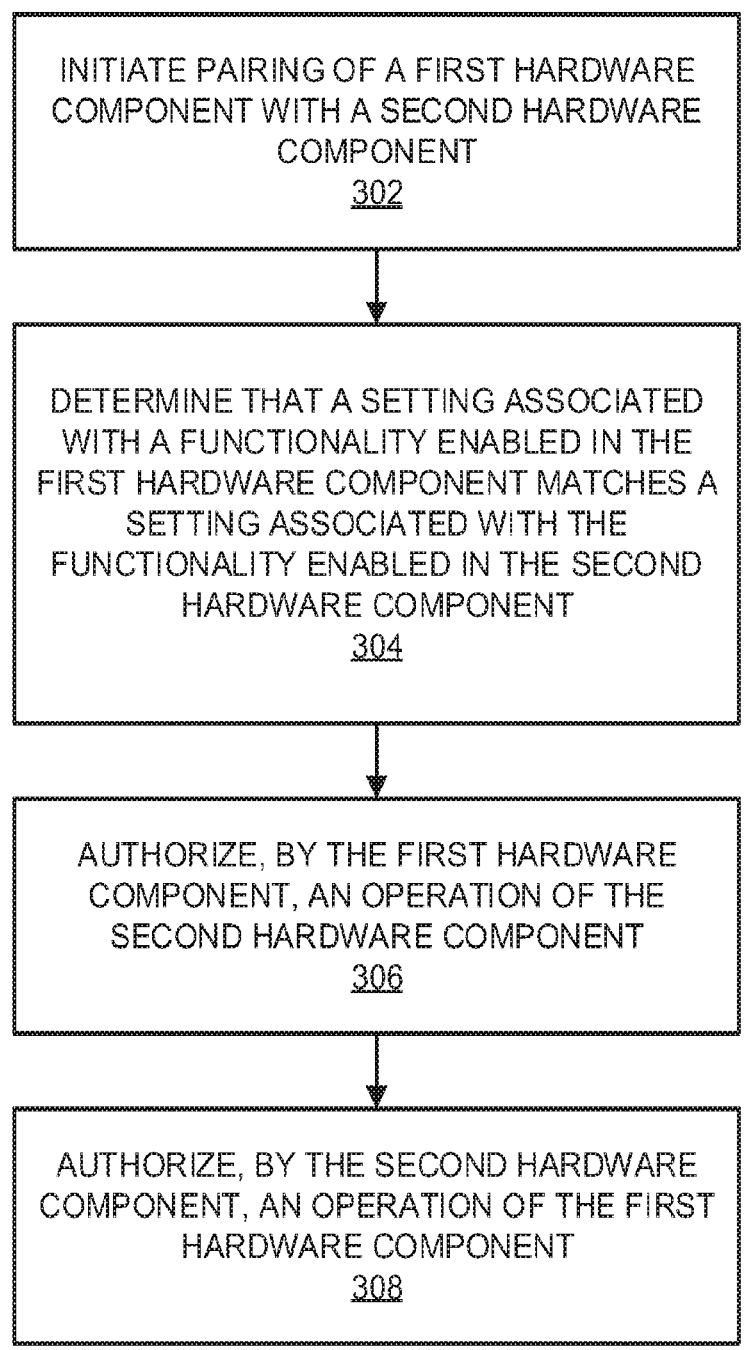
FIG. 3 shows a flow diagram of an example method for initiating pairing between a first hardware component and a second hardware component to establish a trusted relationship and for authorizing an operation of the first hardware component and/or the second hardware component.

Various manners in which the processors 104, 204 may operate are discussed in greater detail with respect to the method 300 depicted in FIG. 3. FIG. 3 depicts a flow diagram of an example method 300 for initiating pairing between a first hardware component 102 and a second hardware component 202 to establish a trusted relationship and for authorizing an operation of the first hardware component 102 and/or the second hardware component 202. It should be understood that the method 300 depicted in FIG. 3 may include additional operations and that some of the operations described therein may be removed and/or modified without departing from the scope of the method 300. The description of the method 300 is made with reference to the features depicted in FIGS. 1 and 2 for purposes of illustration.

At block 302, the processor 104 may initiate pairing of a first hardware component 102 with a second hardware component 202. In this regard, the pairing may establish a trusted relationship between the first hardware component 102 and the second hardware component 202.

In some examples, the processors 104, 204 may share, between the first hardware component 102 and the second hardware component 202, identities of the first hardware component 102 and the second hardware component 202. The identity of the first hardware component 102, such as the first device identity 214 as depicted in FIG. 2, may include a first device identifier 216 and a first credential 218. Likewise, the identity of the second hardware component 202, such as the second device identity 224, may include a second device identifier 226 and a second credential 228. In this regard, the first device identifier 216 and the second device identifier 226 may be identifiers that provide a uniqueness and trackability to the respective hardware component. The first credential 218 and the second credential 228 may be credentials that provide cryptographic verification of authenticity and ownership. The processors 104, 204 may initiate verification to attest to the identities of the first hardware component 102 and the second hardware component 202. Based on a determination that the identities of the first hardware component 102 and the second hardware component 202 are verified, the processors 104, 204 may establish the trusted relationship between the first hardware component 102 and the second hardware component 202. As such, each hardware component may have a unique identity that may be verified, and thus a hardware component may not simply be taken from a first apparatus, such as apparatus 100, and installed in a second apparatus that is different than the first apparatus to replace a corresponding hardware component in the second apparatus.

In some examples, the processors 104, 204 may generate an authentication key to verify the first hardware component 102 and the second hardware component 202. In this regard, the processor 104, 204 may generate the authentication key to include a unique authentication key associated with a third hardware component. In some examples, the authentication key may include the unique authentication key from the third hardware component, a first credential 218 associated with the first hardware component 102, and a second credential 228 associated with the second hardware component 202.

At block 304, in response to a successful pairing between the first hardware component 102 and the second hardware component 202 in block 302, the processor 104 may determine that a first setting 220 associated with a first functionality enabled in the first hardware component 102 matches a second setting 230 associated with a second functionality enabled in the second hardware component 202. In this regard, the first functionality may be the same as the second functionality. In some examples, the first setting 220 may include the same set of settings as the second setting 230, and the first setting 220 may match the second setting 230 when each setting in the set of settings match each other.

At block 306, based on a determination that the first setting 220 matches the second setting 230, the processor 104 of the first hardware component 102 may authorize an operation of the second hardware component 202. In addition, at block 308, the second processor 204 of the second hardware component 202 may authorize an operation of the first hardware component 102.

In some examples, the trusted relationship between hardware components in the apparatus 100 may be verified/established throughout the life of the apparatus 100. For instance, each time the first hardware component 102 and/or the second hardware component 202 is powered on, the processor 104 may initiate the pairing and verification process to establish the trusted relationship between the first hardware component 102 and the second hardware component 202.

In some examples, in response to an unsuccessful pairing between the first hardware component 102 and the second hardware component 202 or in response to a determination that the first setting 220 does not match the second setting 230, the processor 104 may cause operation of the second hardware component 202 to be prevented. In addition or alternatively, the second processor 204 may cause operation of the first hardware component 102 to be prevented.

In some examples, the processor 104 may cause a trusted relationship between the first hardware component 102 and a cloud service 212 to be established by, for instance, performing a pairing process between the first hardware component 102 and the cloud service 212. In addition, the processor 104 may establish a trusted relationship to be inherited between the second hardware component 202 and the cloud service 212 based on the trusted relationship between the first hardware component 102 and the second hardware component 202 and the trusted relationship between the first hardware component 102 and the cloud service 212. In some examples, the processor 104 may establish the trusted relationship between the second hardware component 202 and the cloud service 212 without a pairing process being performed between the second hardware component 202 and the cloud service 212 by using other known trusted relationships.

In some examples, one of the processors 104, 204 may determine that the first hardware component 102 or the second hardware component 202 is a new hardware component. In this regard, the processor 104, 204 may request a cloud service 212 to authorize installation of the new hardware component, and based on an authorization from the cloud service 212, may establish pairing between the new hardware component and a remaining one of the first hardware component 102 or the second hardware component 202.

Some or all of the operations set forth in the method 300 may be included as utilities, programs, or subprograms, in any desired computer accessible medium. In addition, the method 300 may be embodied by computer programs, which may exist in a variety of forms both active and inactive. For example, they may exist as computer-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 4:
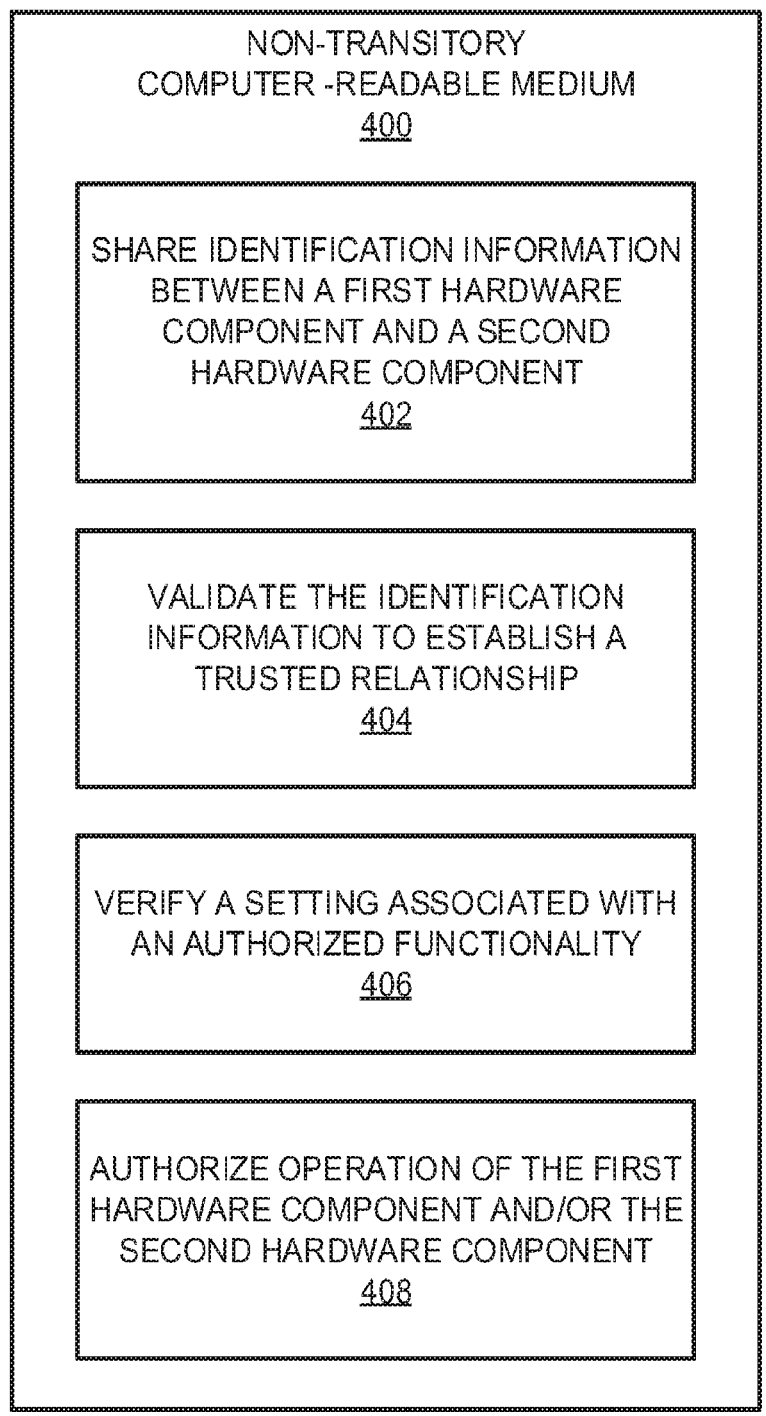
FIG. 4 depicts a block diagram of an example non-transitory computer-readable medium that may have stored thereon computer-readable instructions to authorize operation of the first hardware component and/or the second hardware component.

Turning now to FIG. 4, there is shown a block diagram of a non-transitory computer-readable medium 400 that may have stored thereon computer-readable instructions to authorize operation of a first hardware component 102 and/or a second hardware component 202. It should be understood that the computer-readable medium 400 depicted in FIG. 4 may include additional instructions and that some of the instructions described herein may be removed and/or modified without departing from the scope of the computer-readable medium 400 disclosed herein. The computer-readable medium 400 may be a non-transitory computer-readable medium. The term "non-transitory" does not encompass transitory propagating signals.

The computer-readable medium 400 may have stored thereon computer-readable instructions 402-408 that a processor, such as the processor 104, 204 depicted in FIGS. 1-2, may execute. The computer-readable medium 400 may be an electronic, magnetic, optical, or other physical storage device that contains or stores executable instructions. The computer-readable medium 400 may be, for example, Random-Access memory (RAM), an Electrically Erasable Programmable Read-Only Memory (EEPROM), a storage device, an optical disc, or the like.

The processor may fetch, decode, and execute the instructions 402 to share identification information between a first hardware component 102 and a second hardware component 202. The shared identification information may include a device identity 214, 224, which may include a device identifier 216, 226 and a credential 218, 228 to uniquely identify the respective hardware components 102, 202.

The processor may fetch, decode, and execute the instructions 404 to validate the identification information to establish a trusted relationship between the first hardware component 102 and the second hardware component 202. In response to a determination that the trusted relationship has been established between the first hardware component 102 and the second hardware component 202, the processor may fetch, decode, and execute the instructions 406 to verify a first setting 220 of the first hardware component 102 associated with a first authorized functionality and a second setting 230 of the second hardware component 202 associated with a second authorized functionality.

In some examples, the first setting 220 associated with the first hardware component 102 and the second setting 230 associated with the second hardware component 202 may be the same. The processor may compare the first setting 220 to the second setting 230 to verify that the first and second settings 220, 230 have been maintained.

The processor may fetch, decode, and execute the instructions 408 to authorize operation of the first hardware component 102 and/or the second hardware component 202 in response to a successful verification of the first setting 220 and the second setting 230. In some examples, in response to an unsuccessful pairing between the first hardware component 102 and the second hardware component 202 or in response to a determination that the first setting 220 and the second setting 230 do not correspond to each other, the processor may prevent operation of the first hardware component 102 and/or the second hardware component 202.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a first hardware component including:
a first memory; and
a first processor to:
initiate pairing between the first hardware component and a second hardware component of the apparatus to establish a trusted relationship between the first hardware component and the second hardware component;
in response to a successful pairing between the first hardware component and the second hardware component, compare a first setting of the first hardware component with a second setting of the second hardware component;
in response to a determination that the second setting corresponds to the first setting such that the second setting includes an authorized functionality of the apparatus, authorize operation of the second hardware component, wherein the first setting defines a functionality of the first hardware component and defines the authorized functionality of the apparatus, and wherein the second setting defines a functionality of the second hardware component;
determine that the second hardware component is a new hardware component installed in the apparatus;
receive, from a cloud service, an authorization of the second hardware component by the cloud service; and
authorize a new trusted relationship with the second hardware component based on the authorization of the second hardware component from the cloud service.

2. The apparatus of claim 1, wherein the first processor is to:
in response to an unsuccessful pairing with the second hardware component or in response to a determination that the second setting does not correspond to the first setting, prevent operation of the second hardware component.

3. The apparatus of claim 1, wherein, to initiate the pairing, the first processor is to:
send a first device identity associated with the first hardware component to the second hardware component, the first device identity to uniquely identify the first hardware component;
in response to a verification of the first device identity at the second hardware component, receive a second device identity associated with the second hardware component, the second device identity to uniquely identify the second hardware component;
initiate verification to attest that the received second device identity is associated with the second hardware component; and
in response to a successful verification of the second device identity, establish the trusted relationship between the first hardware component and the second hardware component.

4. The apparatus of claim 3, wherein the first processor is to:
initiate verification to attest that the received second device identity is associated with the second hardware component based on an authentication key generated to include a unique authentication key associated with a third hardware component, a first credential associated with the first hardware component, and a second credential associated with the second hardware component.

5. The apparatus of claim 1, wherein the first processor is further to:
establish a trusted relationship between the first hardware component and the cloud service; and
enable a trusted relationship to be inherited between the second hardware component and the cloud service based on the trusted relationship between the first hardware component and the second hardware component and the trusted relationship between the first hardware component and the cloud service, wherein the cloud service is configured to authorize or deny a re-pair request for a hardware component.

6. The apparatus of claim 1, wherein the first processor is further to:
determine that the second hardware component is the new hardware component;
request the cloud service to authorize the new hardware component; and
based on an authorization from the cloud service, authorize operation of the new hardware component, wherein the cloud service is configured to authorize or deny a re-pair request for a hardware component.

7. A method, comprising:
initiating, by a processor, pairing of a first hardware component installed within an apparatus with a second hardware component installed within the apparatus, wherein the first hardware component receives from a cloud service, authorization of the second hardware component to establish a trusted relationship between the first hardware component and the second hardware component, wherein a trusted relationship between the second hardware component and the cloud service is inherited without a pairing process between the second hardware component and the cloud service;
in response to a successful pairing between the first hardware component and the second hardware component, determining, by the processor, that a first setting associated with a first functionality enabled in the first hardware component matches a second setting associated with a second functionality enabled in the second hardware component, the first functionality being the same as the second functionality, wherein the first functionality and the second functionality are authorized functionality for the apparatus; and
based on a determination that the first setting matches the second setting, authorizing, by the first hardware component, an operation of the second hardware component, and
authorizing, by the second hardware component, an operation of the first hardware component.

8. The method of claim 7, further comprising:
in response to an unsuccessful pairing between the first hardware component and the second hardware component or in response to a determination that the first setting does not match the second setting, preventing operation of the second hardware component by the first hardware component and/or preventing operation of the first hardware component by the second hardware component.

9. The method of claim 7, further comprising:
- each time the first hardware component and/or the second hardware component is powered on, sharing, between the first hardware component and the second hardware component, identities of the first hardware component and the second hardware component;
- initiating verification to attest to the identities of the first hardware component and the second hardware component; and
- based on a determination that the identities of the first hardware component and the second hardware component are verified, establishing the trusted relationship between the first hardware component and the second hardware component.

10. The method of claim 9, further comprising:
- generating an authentication key to verify the first hardware component and the second hardware component, the authentication key to include a unique authentication key associated with a third hardware component, a first credential associated with the first hardware component, and a second credential associated with the second hardware component.

11. The method of claim 7, further comprising:
- establishing a trusted relationship between the first hardware component and the cloud service based on a pairing process between the first hardware component and the cloud service; and
- establishing a trusted relationship to be inherited between the second hardware component and the cloud service based on the trusted relationship between the first hardware component and the second hardware component and the trusted relationship between the first hardware component and the cloud service,
- wherein the trusted relationship between the second hardware component and the cloud service is established without a pairing process between the second hardware component and the cloud service.

12. The method of claim 7, further comprising:
- determining that the first hardware component or the second hardware component is a new hardware component;
- requesting the cloud service to authorize installation of the new hardware component; and
- based on an authorization from the cloud service, establishing pairing between the new hardware component and a remaining one of the first hardware component or the second hardware component.

13. A non-transitory computer-readable medium on which is stored computer-readable instructions that when executed cause a processor of a computing device to:
- share identification information between a first hardware component and a second hardware component of an apparatus, wherein the first hardware component receives, from a cloud service, authorization of the second hardware component;
- validate the identification information to establish a trusted relationship between the first hardware component and the second hardware component;
  - in response to a determination that the trusted relationship has been established between the first hardware component and the second hardware component, verify a first setting of the first hardware component associated with a first authorized functionality and a second setting of the second hardware component associated with a second authorized functionality; and
  - in response to a successful verification of the first setting and the second setting being an authorized functionality of the apparatus, authorize operation of the first hardware component to perform the first setting and the second hardware component to perform the second setting together within the apparatus.

14. The non-transitory computer-readable medium of claim 13, wherein the instructions are further to cause the processor to:
- in response to an unsuccessful pairing between the first hardware component and the second hardware component or in response to a determination that the first setting and the second setting do not correspond to each other, prevent operation of the first hardware component and/or the second hardware component.

15. The apparatus of claim 1, wherein the authorized functionality of the apparatus includes a functionality that corresponds to a business logic associated with the apparatus, wherein the business logic includes licensed features of the apparatus.

16. The apparatus of claim 1, wherein the second hardware component is installed to replace a third hardware component of the apparatus.

* * * * *